(12) United States Patent
Lu

(10) Patent No.: US 11,373,818 B2
(45) Date of Patent: Jun. 28, 2022

(54) TOUGH DEVICE

(71) Applicants: LITE-ON ELECTRONICS (GUANGZHOU) LIMITED, Guangzhou (CN); Lite-On Technology Corporation, Taipei (TW)

(72) Inventor: Cheng-An Lu, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/783,175

(22) Filed: Feb. 6, 2020

(65) Prior Publication Data

US 2020/0272259 A1 Aug. 27, 2020

Related U.S. Application Data

(60) Provisional application No. 62/808,818, filed on Feb. 21, 2019.

(30) Foreign Application Priority Data

Aug. 6, 2019 (CN) .......................... 201910720624.3

(51) Int. Cl.
*G06F 3/041* (2006.01)
*G06F 3/045* (2006.01)
*H01H 13/14* (2006.01)
*G06F 1/16* (2006.01)
*H01H 3/12* (2006.01)
*H01H 13/705* (2006.01)
*H01H 13/83* (2006.01)
*G05G 1/10* (2006.01)
*G06F 3/0354* (2013.01)
*G06F 3/0362* (2013.01)

(52) U.S. Cl.
CPC ............... *H01H 13/14* (2013.01); *G05G 1/10* (2013.01); *G06F 1/169* (2013.01); *G06F 1/1664* (2013.01); *G06F 3/0362* (2013.01); *G06F 3/03543* (2013.01); *G06F 3/041* (2013.01); *H01H 3/125* (2013.01); *H01H 13/705* (2013.01); *H01H 13/83* (2013.01); *G06F 1/1616* (2013.01); *G06F 2203/04103* (2013.01); *H01H 2217/01* (2013.01); *H01H 2219/03* (2013.01); *H01H 2219/036* (2013.01); *H01H 2221/07* (2013.01)

(58) Field of Classification Search
CPC .......................... G06F 3/1431; G09G 2330/06
See application file for complete search history.

(56) References Cited

U.S. PATENT DOCUMENTS

2005/0181843 A1* 8/2005 Tsujimoto ............ H01H 13/702
455/575.1
2008/0257707 A1* 10/2008 Murase .................. H01H 13/81
200/600

(Continued)

*Primary Examiner* — Nan-Ying Yang
(74) *Attorney, Agent, or Firm* — JCIPRNET

(57) ABSTRACT

The present invention provides a touch device, including a cover plate, a circuit board, a bracket, and a noise reduction layer group. The circuit board is fixed below the cover plate. The circuit board is provided with a trigger zone located on a bottom surface, and includes an elastic sheet located in the trigger zone. The bracket is disposed below the circuit board. The noise reduction layer group is disposed between the bracket and the elastic sheet.

12 Claims, 6 Drawing Sheets

(56) References Cited

U.S. PATENT DOCUMENTS

| | | | |
|---|---|---|---|
| 2009/0255755 A1* | 10/2009 | Matsuyama | B60R 13/083 181/290 |
| 2013/0257712 A1* | 10/2013 | Imamura | G06F 1/1658 345/156 |
| 2014/0071654 A1* | 3/2014 | Chien | H01H 13/83 362/23.03 |
| 2017/0262111 A1* | 9/2017 | Sang | G06F 3/041 |

* cited by examiner

TOUGH DEVICE

CROSS-REFERENCE TO RELATED APPLICATION

This application claims the priority benefits of U.S. provisional application Ser. No. 62/808,818, filed on Feb. 21, 2019, and China application serial no. 201910720624.3, filed on Aug. 6, 2019. The entirety of each of the above-mentioned patent applications is hereby incorporated by reference herein and made a part of this specification.

BACKGROUND OF THE INVENTION

1. Field of the Invention

The present invention relates to a touch device, and more particularly to a touch device for reducing noise.

2. Description of Related Art

Portable electronic devices such as notebook computers, smart phones or tablet computers are convenient to carry and can process, receive and transmit information in real time, and thus, are widely accepted by consumers and become the mainstream in the current electronic consumer market.

Taking a notebook computer as an example, in terms of controlling the position of a cursor on a display screen, the notebook computer can further utilize a touch device integrated on a casing to achieve a similar function of controlling cursor to move or click on the display screen through the mouse.

However, when a user uses the touch device, each time a touch panel of the touch device is pressed, an elastic sheet below the touch panel impacts a bracket, thereby generating noise and affecting the user experience. Therefore, how to reduce the noise generated by the touch device during use is one of the problems to be solved in the field.

SUMMARY OF THE INVENTION

The present invention is directed to a touch device capable of reducing noise generated when pressed.

The touch device of the present invention includes a cover plate, a circuit board, a bracket, and a noise reduction layer group. The circuit board is fixed below the cover plate. The circuit board is provided with a trigger zone located on a bottom surface, and includes an elastic sheet located in the trigger zone. The bracket is disposed below the circuit board. The noise reduction layer group is disposed between the bracket and the elastic sheet.

In an embodiment of the present invention, the noise reduction layer group includes a soft layer and a hard layer which are stacked, the soft layer facing the elastic sheet, and the hard layer facing the bracket.

In an embodiment of the present invention, the Shore hardness C of the soft layer is between 50 degrees and 60 degrees, and the Shore hardness C of the hard layer is between 70 degrees and 80 degrees.

In an embodiment of the present invention, the difference between the Shore hardness C of the hard layer and the Shore hardness C of the soft layer is between 10 degrees and 20 degrees.

In an embodiment of the present invention, the bracket is provided with a hole at a part corresponding to the elastic sheet.

In an embodiment of the present invention, when the elastic sheet is pressed down, a portion of the hard layer falls into the hole.

In an embodiment of the present invention, the thickness of the hard layer is between 0.2 mm and 0.3 mm, and the thickness of the soft layer is between 0.1 mm and 0.2 mm.

In an embodiment of the present invention, a ratio of the thickness of the hard layer to the thickness of the soft layer is between 2 and 3.

In an embodiment of the present invention, the diameter of the hole is smaller than the diameter of the elastic sheet.

In an embodiment of the present invention, the bracket is provided with no hole at a part corresponding to the elastic sheet.

In an embodiment of the present invention, the thickness of the hard layer is between 0.2 mm and 0.3 mm, and the thickness of the soft layer is between 0.3 mm and 0.5 mm.

In an embodiment of the present invention, a ratio of the thickness of the hard layer to the thickness of the soft layer is between 0.6 and 0.8.

Based on the above, the touch device of the present invention includes the noise reduction layer group disposed between the bracket and the elastic sheet, which absorbs the force of the elastic sheet impacting the bracket to reduce the noise generated when the elastic sheet impacts the bracket.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
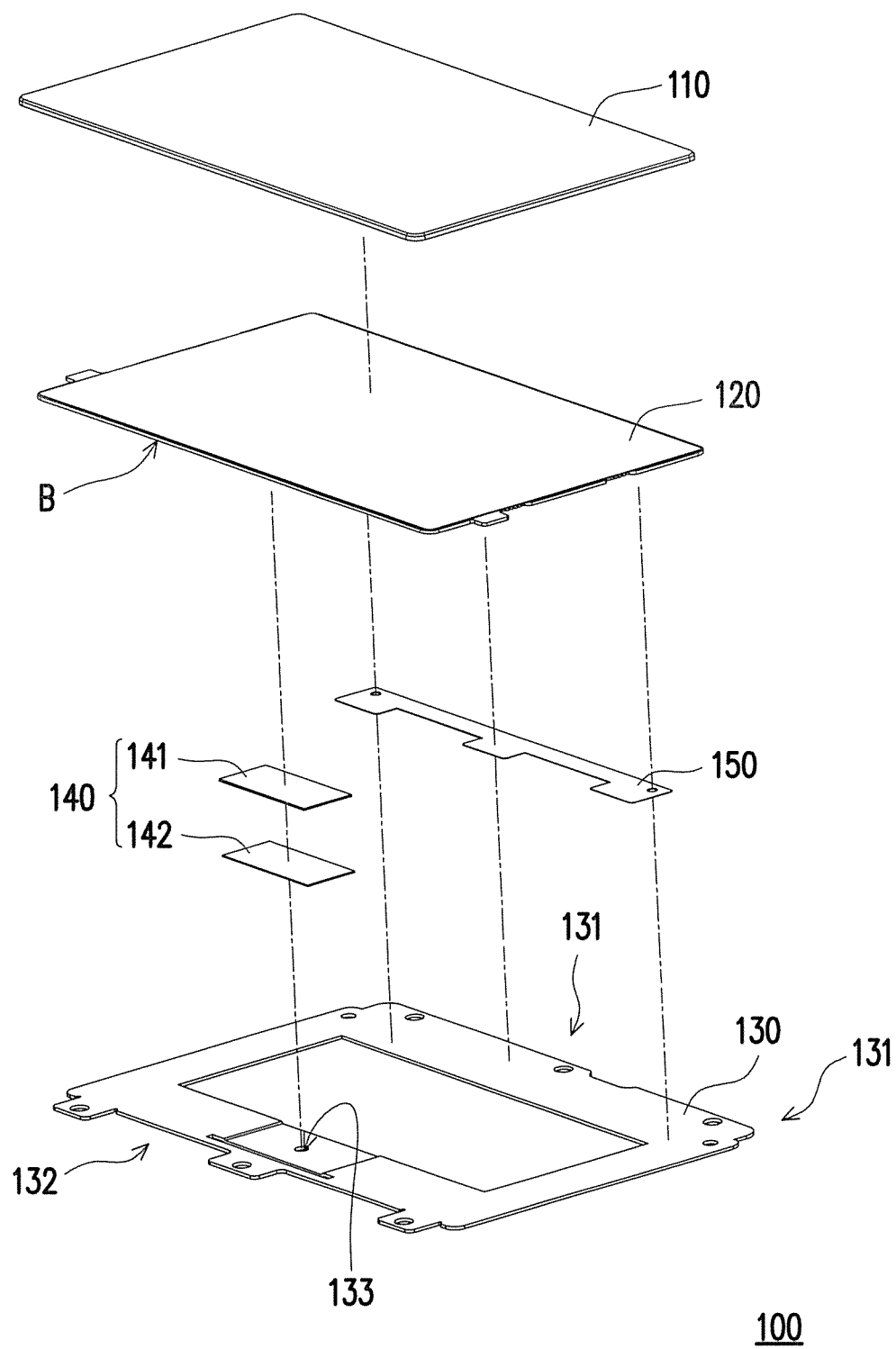
FIG. 1A is an exploded schematic view of a touch device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts. For parts, components or steps denoted by same reference numbers or names, reference can be made to the related descriptions.

Figure 1B:
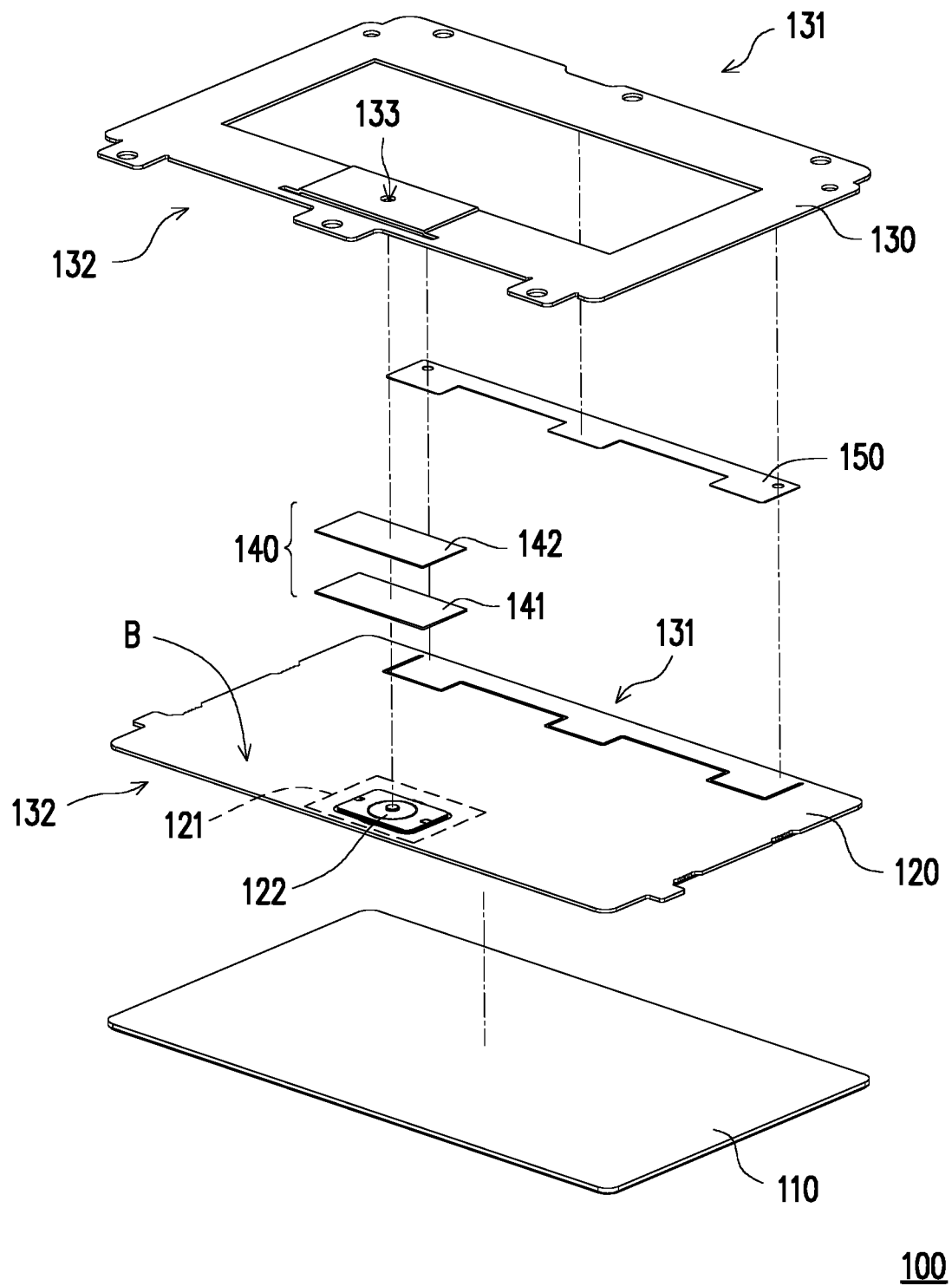
FIG. 1B is an exploded schematic view of the touch device of FIG. 1 from another viewing angle.

FIG. 1A is an exploded schematic view of a touch device according to an embodiment of the present invention. FIG. 1B is an exploded schematic view of the touch device of FIG. 1 from another viewing angle. Referring to FIG. 1A and FIG. 1B, the touch device 100 of the present embodiment includes a cover plate 110, a circuit board 120, a bracket 130, and a noise reduction layer group 140. Herein, the touch device 100 is adapted to be disposed in a notebook computer (not shown). However, in other embodiments, the touch device 100 is also disposed on a tablet computer or the like, and is not limited thereto. It should be noted that FIG.

1B is a viewing angle after the touch device 100 of FIG. 1A is turned by 180 degrees to more clearly illustrate other components of the touch device 100.

As shown in FIG. 1A, the circuit board 120 is fixed below the cover plate 110. The bracket 130 is disposed below the circuit board 120. As shown in FIG. 1B, the circuit board 120 is provided with a trigger zone 121 located on a bottom surface B, and includes an elastic sheet 122 and a circuit switch 123 (FIG. 3) located in the trigger zone 121. The noise reduction layer group 140 is disposed between the bracket 130 and the elastic sheet 122.

In the present embodiment, the elastic sheet 122 is in a dome shape (FIG. 3), but is not limited thereto. In the present embodiment, the elastic sheet 122 is a metal elastic diaphragm, but the form of the elastic sheet 122 is not limited thereto. The material of the bracket 130 of the present embodiment is metal, for example, stainless steel (SUS304), but the material of the bracket 130 is not limited thereto.

In the present embodiment, the bracket 130 is provided with a first side 131 and a second side 132 opposite to each other. The cover plate 110 is pivotally connected to the first side 131 of the bracket 130. The circuit board 120 is fixed to the first side 131 of the bracket 130 by an elevating member 150 of the touch device 100. In the present embodiment, the elevating member 150 is, for example, bonded to the circuit board 120 and the bracket 130 by an adhesive, but in other embodiments, the manner in which the elevating member 150 is bonded to the circuit board 120 and the bracket 130 is not limited thereto.

In the present embodiment, the elevating member 150 is located on the first side 131, and used for providing a fulcrum or a rotating shaft when the second side 132 is pressed, so that the second side 132 is slightly rotated relative to the elevating member 150. In the present embodiment, the elevating member 150 is, for example, a hinge or a pivot, but in other embodiments, is not limited thereto.

In the present embodiment, the cover plate 110 includes a glass plate and a touch line (not shown) disposed on the glass plate, but is not limited thereto. A user controls the movement of a cursor by sliding a finger on the cover plate 110, and makes the cover plate 110 press against the elastic sheet 122 and trigger the circuit switch 123 by pressing the cover plate 110 to achieve the function of controlling the cursor to click on a display screen of a notebook computer (not shown).

Generally, in a conventional touch device, since the cover plate is pivotally connected to the first side of the bracket, when the user presses the second side of the cover plate, the second side of the cover plate moves downward to press against the elastic sheet, and the elastic sheet impacts the bracket to produce a sound. In the present embodiment, the noise reduction layer group 140 contacts the second side 132 of the bracket 130 and is located between the elastic sheet 122 and the bracket 130 to reduce noise generated during impact. The noise reduction layer group 140 will be described in more detail below.

Figure 2:
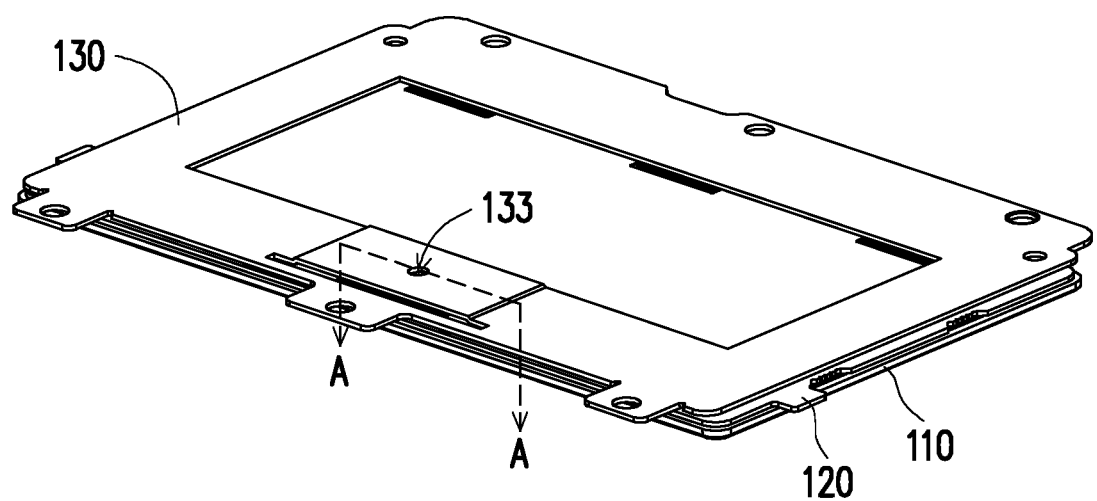
FIG. 2 is an assembled view of the touch device of FIG. 1B.
Figure 3:
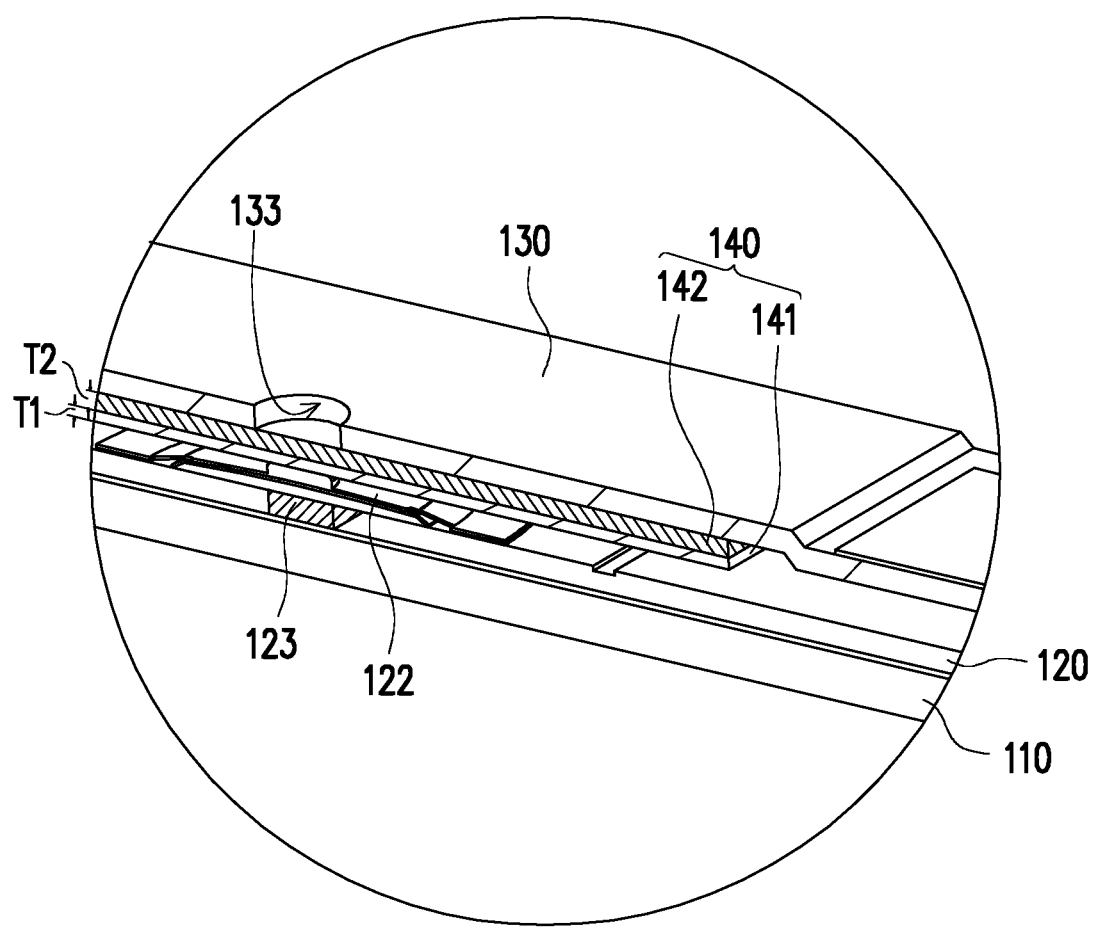
FIG. 3 is a cross-sectional schematic view of the touch device of FIG. 2 taken along line A-A.

FIG. 2 is an assembled view of the touch device of FIG. 1B. FIG. 3 is a cross-sectional schematic view of the touch device of FIG. 2 taken along line A-A. Referring to FIG. 3, the noise reduction layer group 140 of the present embodiment includes a soft layer 141 and a hard layer 142 which are stacked. The hardness of the soft layer 141 and the hardness of the hard layer 142 are respectively smaller than the hardness of the bracket 130. In the present embodiment, the soft layer 141 faces the elastic sheet 122, and the hard layer 142 faces the bracket 130. Herein, the soft layer 141 includes a foam sheet, a polyurethane sheet, a rubber sheet or a silicone rubber sheet, and the hard layer 142 includes a Teflon or a Mylar sheet, but the materials of the soft layer 141 and the hard layer 142 are not limited thereto.

The noise reduction layer group 140 of the present embodiment serves as a buffer assembly of the elastic sheet 122 by the combination of the soft layer 141 and the hard layer 142, so that the elastic sheet 122 does not directly impact the bracket 130 when pressed. In addition, the noise reduction layer group 140 of the present embodiment absorbs the force when the elastic sheet 122 is pressed down by the soft layer 141, thereby reducing the force of the elastic sheet 122 impacting the bracket 130, so as to reduce the noise generated when the elastic sheet 122 is pressed down. The noise reduction layer group 140 of the present embodiment provides sufficient hardness by the hard layer 142, so that the user's force used to press the touch device 100 is not completely absorbed by the soft layer 141, and the elastic sheet 122 is still deformed by compression to trigger the circuit switch 123.

In the present embodiment, the soft layer 141 and the hard layer 142 are bonded to each other by an adhesive. However, in other embodiments, the manner in which the soft layer 141 and the hard layer 142 are bonded is not limited thereto. In an embodiment, the soft layer 141 and the hard layer 142 are also integrated, for example, composed of a composite material. In another embodiment, the soft layer 141 and the hard layer 142 are also made by plastic injection molding, and are not limited to the above.

In the present embodiment, the Shore hardness C of the soft layer 141 is between 50 degrees and 60 degrees, and the Shore hardness C of the hard layer 142 is between 70 degrees and 80 degrees. In other words, the difference between the Shore hardness C of the hard layer 142 and the Shore hardness C of the soft layer 141 of the present embodiment is between 10 degrees and 20 degrees.

Of course, in other embodiments, the noise reduction layer group 140 is only provided with a single layer structure, and has the hardness smaller than the hardness of the bracket 130, but is not limited to the above.

More specifically, in an embodiment, the noise reduction layer group 140 includes only the soft layer 141. As long as the thickness of the soft layer 141 is appropriately designed (for example, the soft layer 141 is thickened), the soft layer 141 also provides the buffer required when the elastic sheet 122 is pressed down. When the elastic sheet 122 is pressed down, the elastic sheet 122 does not directly impact the bracket 130, but the impact force of the elastic sheet 122 is absorbed by the soft layer 141, thereby reducing the noise generated when the elastic sheet 122 is pressed down.

In another embodiment, the noise reduction layer group 140 includes only the hard layer 142. Since the hard layer 142 is disposed between the elastic sheet 122 and the bracket 130, when the elastic sheet 122 is pressed down, the elastic sheet 122 does not directly impact the bracket 130, but the impact force of the elastic sheet 122 is absorbed by the hard layer 142, thereby reducing the noise generated when the elastic sheet 122 is pressed down.

It is worth mentioning that in the present embodiment, the bracket 130 is provided with a hole 133 at a part corresponding to the elastic sheet 122, and the hole 133 provides a space in which the noise reduction layer group 140 retreats, so that the noise reduction layer group 140 has a better buffer effect. That is, the design of the hole 133 disposed in the bracket 130 further reduces the force of the elastic sheet 122 impacting the bracket 130. In the present embodiment, the diameter of the hole 133 is between 2 mm and 4 mm. However, in other embodiments, as long as the diameter of the hole 133 is smaller than the diameter of the elastic sheet 122, it is within the protection scope of the present invention.

In the present embodiment, the thickness T2 of the hard layer 142 is between 0.2 mm and 0.3 mm, and the thickness T1 of the soft layer 141 is between 0.1 mm and 0.2 mm. In the present embodiment, the hard layer 142 is thicker than the soft layer 141. Preferably, a ratio of the thickness T2 of the hard layer 142 to the thickness T1 of the soft layer 141 is between 2 and 3 to achieve moderate noise reduction and buffer effects.

The reason for this design is that if the soft layer 141 is too thick (not within the above ratio range), the user must use larger force to press the cover plate 110, resulting in excessive pressing load on the cover plate 110. Furthermore, since the amount of compression of the soft layer 141 is large, the pressing stroke of the cover plate 110 is too large, resulting in poor user experience. Conversely, if the soft layer 141 is too thin (not within the above ratio), effective buffer cannot be provided. When the user presses the cover plate 110, the soft layer 141 doesn't absorb the force when the elastic sheet 122 is pressed down, so that it is easy to produce permanent deformation of the hard layer 142 at the part near the hole 133 and cause unexpected influence on the pressing stroke of the cover plate 110 and the pressing feeling of the cover plate 110. On the other hand, if the hard layer 142 is too thick (not within the above ratio range), when the user presses the cover plate 110, the hard layer 142 does not retreat to the space provided by the hole 133, so that the hard layer 142 is not effectively deformed at the part near the hole 133 and doesn't achieve the shock absorbing effect, and the noise suppressing effect is not good. Conversely, if the hard layer 142 is too thin (not within the above ratio range), when the user presses the cover plate 110, the hard layer 142 does not provide the force for pressing against the soft layer 141 (the hard layer 142 is too thin and not hard enough, and is equivalent to a too thick soft layer 141 when being placed together with the soft layer 141), so that the user must use larger force to press the cover plate 110, resulting in excessive pressing load on the cover plate 110 and excessive pressing stroke of the cover plate 110, causing poor user experience.

However, in other embodiments, the thickness T2 of the hard layer 142 and the thickness T1 of the soft layer 141 are adjusted according to different loads or acoustic specifications, and are not limited to the above.

Figure 4:
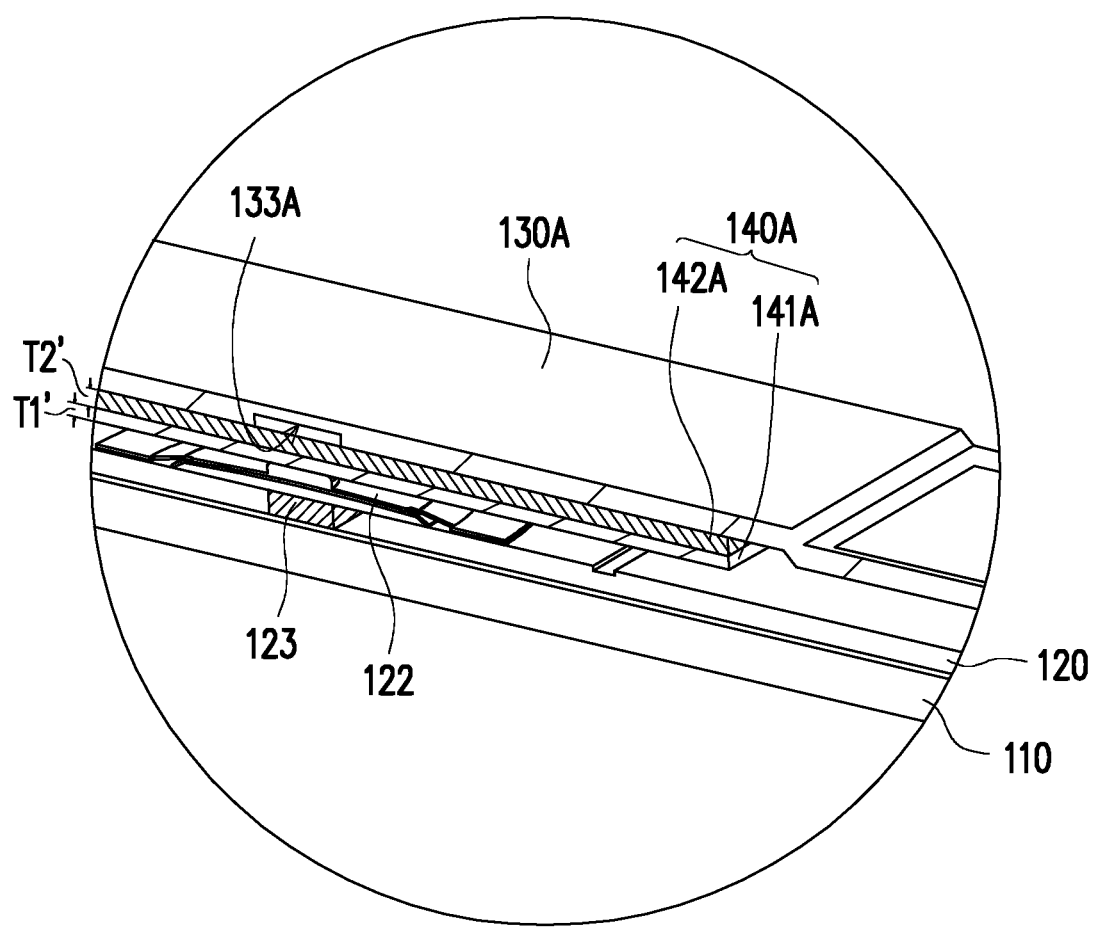
FIG. 4 and FIG. 5 are cross-sectional schematic views of multiple touch devices according to other embodiments of the present invention.
Figure 5:
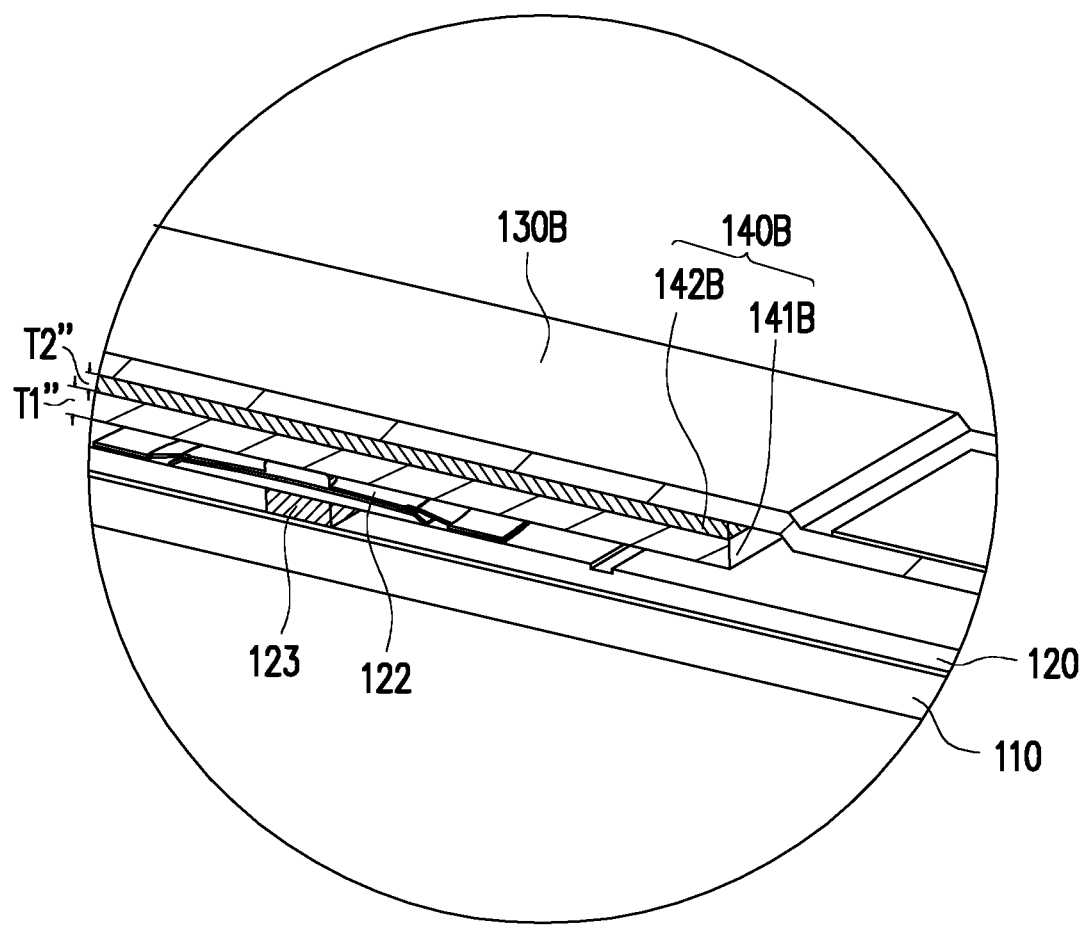

FIG. 4 and FIG. 5 are cross-sectional schematic views of multiple touch devices according to other embodiments of the present invention. As shown in FIG. 4, a bracket 130A of the present embodiment is slightly different from the bracket 130 of FIG. 3 in that in the present embodiment, the hole 133A does not run through the bracket 130A. The hole 133A also provides a space in which a noise reduction layer group 140A retreats, so that the noise reduction layer group 140A has a good buffer effect. In addition, in the present embodiment, the thickness T1' of a soft layer 141A is larger than the thickness T1 of the soft layer 141 of FIG. 3 to absorb the impact force of the elastic sheet 122, so that the noise reduction layer group 140A provides buffer and noise reduction effects close to the noise reduction layer group 140. Of course, in other embodiments, the thickness of the soft layer 141A may be the same as the thickness T1 of the soft layer 141 of FIG. 3, and the thickness of the soft layer 141A is not limited to the above.

As shown in FIG. 5, a bracket 130B of the present embodiment is slightly different from the bracket 130A of FIG. 3 in that in the present embodiment, the bracket 130B is provided with no hole 133 at the part corresponding to the elastic sheet 122. In the present embodiment, the thickness T2" of a hard layer 142B is between 0.2 mm and 0.3 mm, and the thickness T1" of a soft layer 141B is between 0.3 mm and 0.5 mm. Preferably, a ratio of the thickness T2" of the hard layer 142B to the thickness T1" of the soft layer 141B is between 0.6 and 0.8 to achieve moderate noise reduction and buffer effects.

The reason for this design is that if the soft layer 141B is too thick (not within the above ratio range), the user must use larger force to press the cover plate 110, resulting in excessive pressing load on the cover plate 110. Furthermore, since the amount of compression of the soft layer 141 is large, the pressing stroke of the cover plate 110 is too large, resulting in poor user experience. Conversely, if the soft layer 141B is too thin (not within the above ratio range), the shock absorbing effect of the soft layer 141B is not good, and the noise suppressing effect of the noise reduction layer group 140B is not good. On the other hand, if the hard layer 142B is too thick (not within the above ratio range), the shock absorbing effect is not good, so that the noise suppressing effect of the noise reduction layer group is not good (the same as the case that the soft layer 141B is too thin). Conversely, if the hard layer 142B is too thin (not within the above ratio range), when the user presses the cover plate 110, the hard layer 142B does not provide the force for pressing against the soft layer 141B (the hard layer 142B is too thin and not be hard enough, and is equivalent to a too thick soft layer 141B when being placed together with the soft layer 141B), so that the user must use larger force to press the cover plate 110, resulting in excessive pressing load on the cover plate 110 and excessive pressing stroke of the cover plate 110, causing poor user experience.

In the present embodiment, the thickness T1" of the soft layer 141B is larger than the thickness T1' of the soft layer 141B of FIG. 3 and the thickness T1' of the soft layer 141A of FIG. 4 to absorb the impact force of the elastic sheet 122, so that the noise reduction layer group 140B provides buffer and noise reduction effects close to the noise reduction layer group 140 and the noise reduction layer group 140A. Of course, in other embodiments, the thickness of the soft layer 141B may be the same as the thickness T1 of the soft layer 141 of FIG. 3 or the same as the thickness T1' of the soft layer 141A of FIG. 4, and the thickness of the soft layer 141B is not limited to the above.

Based on the above, the touch device of the present invention includes the noise reduction layer group. Since the noise reduction layer group is disposed between the bracket and the elastic sheet, when the elastic sheet is pressed down, the noise reduction layer group provides buffer for the elastic sheet to reduce the force of the elastic sheet impacting the bracket, thereby reducing the noise generated when the elastic sheet is pressed down. In addition, in an embodiment, the bracket is provided with the hole at a part corresponding to the elastic sheet, and when the elastic sheet is pressed down, a portion of the noise reduction layer group falls into the hole. The advantage of this design is that the hole provides a larger buffer space for the elastic sheet, that is, the design of the hole further reduces the force of the elastic sheet impacting the bracket to achieve the effect of reducing noise generated when the elastic sheet is pressed down.

It should be finally noted that the above embodiments are merely intended for describing the technical solutions of the present invention other than limiting the present invention. Although the present invention is described in detail with reference to the foregoing embodiments, persons of ordinary skill in the art should understand that they can still make modifications to the technical solutions described in the foregoing embodiments or make equivalent substitutions to some technical features thereof, without departing from scope of the technical solutions of the embodiments of the present invention.

What is claimed is:

1. A touch device, comprising:
a cover plate, wherein the cover plate comprises an input surface, and the input surface is configured for touch control;
a circuit board, fixed below the cover plate, the circuit board comprising a trigger zone located on a bottom surface, and comprising a circuit switch and a metal elastic diaphragm located in the trigger zone, wherein an orthographic projection of the circuit board on the cover plate completely covers an orthographic projection of the metal elastic diaphragm on the cover plate, the bottom surface of the circuit board is away from the cover plate;
a bracket, disposed below the circuit board; and
a noise reduction layer group, disposed between the bracket and the metal elastic diaphragm, wherein in a direction from the bracket to the cover plate, the noise reduction layer group, the metal elastic diaphragm and the circuit switch are disposed sequentially.

2. The touch device according to claim 1, wherein the noise reduction layer group comprises a soft layer and a hard layer which are stacked, the soft layer facing the metal elastic diaphragm, and the hard layer facing the bracket.

3. The touch device according to claim 2, wherein a Shore hardness C of the soft layer is between 50 degrees and 60 degrees, and a Shore hardness C of the hard layer is between 70 degrees and 80 degrees.

4. The touch device according to claim 2, wherein the difference between the Shore hardness C of the hard layer and the Shore hardness C of the soft layer is between 10 degrees and 20 degrees.

5. The touch device according to claim 2, wherein the bracket is provided with a hole at a part corresponding to the metal elastic diaphragm.

6. The touch device according to claim 5, wherein when the metal elastic diaphragm is pressed down, and a portion of the hard layer is pressed into the hole.

7. The touch device according to claim 5, wherein a thickness of the hard layer is between 0.2 mm and 0.3 mm, and a thickness of the soft layer is between 0.1 mm and 0.2 mm.

8. The touch device according to claim 5, wherein a ratio of a thickness of the hard layer to a thickness of the soft layer is between 2 and 3.

9. The touch device according to claim 5, wherein a diameter of the hole is smaller than a diameter of the metal elastic diaphragm.

10. The touch device according to claim 2, wherein the bracket comprises no hole at a part corresponding to the metal elastic diaphragm.

11. The touch device according to claim 10, wherein a thickness of the hard layer is between 0.2 mm and 0.3 mm, and a thickness of the soft layer is between 0.3 mm and 0.5 mm.

12. The touch device according to claim 10, wherein a ratio of a thickness of the hard layer to a thickness of the soft layer is between 0.6 and 0.8.

* * * * *